United States Patent
Cho et al.

(10) Patent No.: US 10,096,836 B2
(45) Date of Patent: Oct. 9, 2018

(54) ELECTRODE, AND METHOD FOR PRODUCING BATTERY AND ELECTRODE

(71) Applicant: INDUSTRY-ACADEMIC COOPERATION FOUNDATION GYEONGSANG NATIONAL UNIVERSITY, Gyeongsangnam-do (KR)

(72) Inventors: Gyu-bong Cho, Gyeongsangnam-do (KR); Tae-hyeon Nam, Gyeongsangnam-do (KR); Ho-suk Ryu, Gyeongsangnam-do (KR); Hyo-jun Ahn, Gyeongsangnam-do (KR); Ki-won Kim, Gyeongsangnam-do (KR); Jou-hyeon Ahn, Gyeongsangnam-do (KR); Kwon-koo Cho, Gyeongsangnam-do (KR)

(73) Assignee: Industry-Academic Cooperation Foundation Gyeongsang National University, Gyeongsangnam-do (KR)

( * ) Notice: Subject to any disclaimer, the term of this patent is extended or adjusted under 35 U.S.C. 154(b) by 0 days.

(21) Appl. No.: 15/547,172

(22) PCT Filed: Jan. 27, 2016

(86) PCT No.: PCT/KR2016/000837
§ 371 (c)(1),
(2) Date: Jul. 28, 2017

(87) PCT Pub. No.: WO2016/122196
PCT Pub. Date: Aug. 4, 2016

(65) Prior Publication Data
US 2018/0013147 A1 Jan. 11, 2018

(30) Foreign Application Priority Data

Jan. 28, 2015 (KR) .................. 10-2015-0013436

(51) Int. Cl.
*H01M 4/02* (2006.01)
*H01M 4/04* (2006.01)
(Continued)

(52) U.S. Cl.
CPC ......... *H01M 4/663* (2013.01); *H01M 4/0409* (2013.01); *H01M 4/0471* (2013.01);
(Continued)

(58) Field of Classification Search
None
See application file for complete search history.

(56) References Cited

U.S. PATENT DOCUMENTS 5,494,762 A 2/1996 Isoyama et al.
8,859,142 B2 10/2014 Matsuyama et al.
(Continued)

FOREIGN PATENT DOCUMENTS

JP H06236758 A 8/1994
JP 2002-203542 A 7/2002
(Continued)

OTHER PUBLICATIONS

KIPO; Notice of Preliminary Rejection in corresponding Korean Patent Application No. 10-2015-0013436; dated Feb. 19, 2016; 9 pages, including English translation.
(Continued)

*Primary Examiner* — Lisha Jiang
(74) *Attorney, Agent, or Firm* — Ulmer & Berne LLP

(57) ABSTRACT

Disclosed is an electrode. An electrode according to the present invention includes an active material layer; and a current collector which includes a plurality of conductive filaments, wherein at least one from among the plurality of conductive filaments is embedded in the active material layer so that a set length is exposed from the surface thereof.

4 Claims, 18 Drawing Sheets

(51) Int. Cl.
| | |
|---|---|
| H01M 4/36 | (2006.01) |
| H01M 4/64 | (2006.01) |
| H01M 4/66 | (2006.01) |
| H01M 4/70 | (2006.01) |
| H01M 4/72 | (2006.01) |
| H01M 4/75 | (2006.01) |
| H01M 4/62 | (2006.01) |
| H01M 4/60 | (2006.01) |

(52) U.S. Cl.
CPC ........... *H01M 4/604* (2013.01); *H01M 4/622* (2013.01); *H01M 4/625* (2013.01); *H01M 2220/30* (2013.01)

(56) References Cited

U.S. PATENT DOCUMENTS

2002/0094472 A1* 7/2002 Xie ..................... H01M 4/8605
429/535
2002/0106561 A1 8/2002 Lee et al.
2012/0107683 A1* 5/2012 Kim, II ............... H01M 4/0404
429/211

FOREIGN PATENT DOCUMENTS

| | | |
|---|---|---|
| JP | 2007-265852 A | 10/2007 |
| JP | 2008-305781 A | 12/2008 |
| JP | 2010-282789 A | 12/2010 |
| JP | 2011-023247 A | 2/2011 |
| JP | 2014-203593 A | 10/2014 |
| KR | 10-1113976 B1 | 3/2012 |

OTHER PUBLICATIONS

KIPO; Notice of Decision of Rejection in corresponding Korean Patent Application No. 10-2015-0013436; dated Oct. 25, 2016; 6 pages, including English translation.

Kim, Dong-Seok; Written Opinion of the International Searching Authority issued in corresponding International Patent Application No. PCT/KR2016/000837; dated May 16, 2016; 8 pages, including English translation.

KIPO; Decision to Grant a Patent in corresponding Korean Patent Application No. 10-2015-0013436; Jan. 1, 2017; 3 pages, including partial English tranlsation.

* cited by examiner

ELECTRODE, AND METHOD FOR PRODUCING BATTERY AND ELECTRODE

TECHNICAL FIELD

Apparatuses and methods consistent with the present disclosure relate to an electrode, a battery and a method for manufacturing the electrode, and more particularly, to an electrode using conductive filaments as a current collector to minimize the weight, a battery and a method for manufacturing the electrode.

BACKGROUND ART

Recently, miniaturization, weight lightening and higher performance of portable electronic devices such as a laptop, PDA, MP3 and a cellular phone are in progress. Accordingly, a secondary battery having a high capacity and high stability is required for a power supply of a portable electronic device. As a secondary battery suiting the purpose, a nickel-cadmium storage battery has been used, and a nickel-hydrogen storage battery as a battery having higher energy density, and a lithium secondary battery as a non-aqueous electrolyte secondary battery have been commercialized.

As a positive electrode active material used in a commercialized lithium secondary battery, $LiCoO_2$ may be mentioned, and a lot of research on replacing it with $LiNiO_2$, $LiMnO_4$, $V_2O_5$, etc. has been recently conducted, but there was a limitation of low energy density. Therefore, research on an electrode material having high theoretical energy density is needed for developing a battery having high energy density. According to recent research, it was reported that a lithium/sulfur battery has high theoretical energy density of 2600 Wh/kg at room temperature. In addition, sulfur is an abundant resource, and cheaper than other electrode materials.

When the electrode is designed to be thick for manufacturing a battery having high energy density, potential unbalance in the electrode may occur, and thus, it was difficult to manufacture a thick electrode. Accordingly, the battery was mostly manufactured by stacking multiple layers of thin electrodes, however, in this case, the weight of the electrode was increased due to the multiple layers of metal current collectors, thereby making it difficult to increase energy density.

Therefore, the need for an electrode having a light weight while being thick to have sufficient energy density was increased.

Technical Problem

The present disclosure provides an electrode having a minimized weight by using conductive filaments as a current collector, a battery and a method for manufacturing the electrode.

Technical Solution

According to an aspect of the present disclosure, an electrode includes an active material layer and a current collector composed of a plurality of conductive filaments, wherein at least one of the plurality of conductive filaments is embedded in the active material layer in a manner such that in a certain length from a surface of the active material layer.

In this case, the plurality of conductive filaments may include metal fiber, carbon fiber or carbon nanotubes.

Meanwhile, the active material layer may include sulfur (S) or a sulfur compound, and the sulfur compound may be an S—C compound or an S-M compound (M=Fe, Ni, Ti, Co or Mn).

Meanwhile, the current collector may have a shape of the plurality of conductive filaments being entangled with each other.

According to another aspect of the present disclosure, a battery includes a positive electrode, an electrolyte and a negative electrode, wherein the positive electrode includes an active material layer and a current collector composed of a plurality of conductive filaments, and at least one of the conductive filaments is embedded in the active material layer in a manner such that in a certain length from a surface of the active material layer.

In this case, the battery may be an alkaline battery.

According to another aspect of the present disclosure, a method for manufacturing an electrode includes applying active material slurry on a metal thin film, embedding the plurality of conductive filaments in the active material slurry applied on the metal thin film, and subjecting the active material slurry embedded with the plurality of conductive filaments to heat treatment at a predetermined temperature.

In this case, the plurality of conductive filaments may include metal fiber, carbon fiber or carbon nanotubes.

Meanwhile, the active material slurry may include sulfur (S) or a sulfur compound, and the sulfur compound may be an S—C compound or an S-M compound (M=Fe, Ni, Ti, Co or Mn).

Meanwhile, the heat treatment may be carried out only at the predetermined temperature, and the active material slurry embedded with the plurality of conductive filaments may be separated from the metal thin film.

Meanwhile, the step of heat treatment may include heat treatment at 300 to 500° C.

Advantageous Effects

As described above, according to the diverse exemplary embodiments of the present disclosure, an electrode may be manufactured without using a heavy metal current collector, and thus, by using this, a very light battery achieving high energy density may be obtained

DETAILED DESCRIPTION

Figure 1:
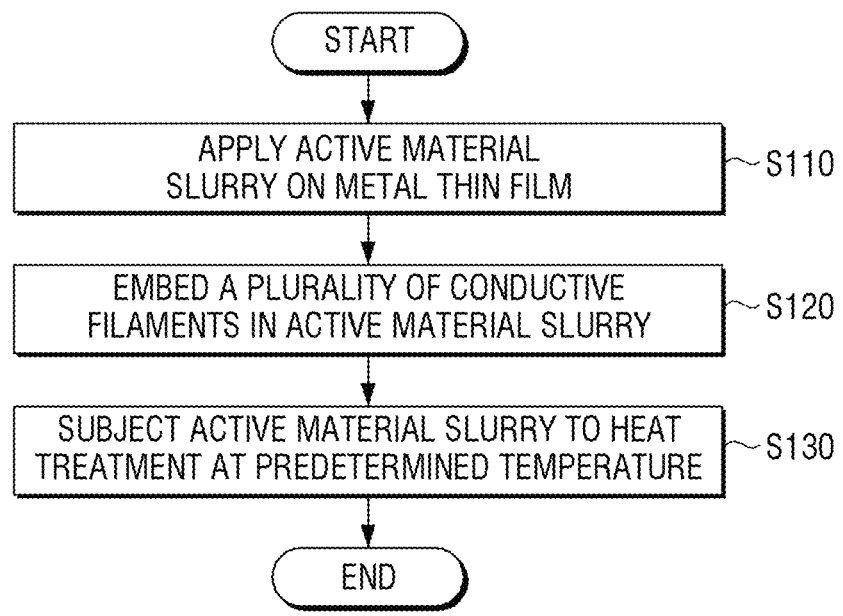
FIG. 1 is a flow chart for describing a method for manufacturing an electrode according to an exemplary embodiment of the present disclosure.

Diverse exemplary embodiments of the present disclosure will now be described in greater detail with reference to the accompanying drawings. However, in the description of the present disclosure, if it is determined that the detailed description of relevant known functions or components makes subject matters of the present disclosure obscure, the detailed description thereof will be omitted. In addition, the following exemplary embodiments may be modified in many other different forms and the scope of the technical idea of the present disclosure is not limited to the following exemplary embodiments. Rather, these exemplary embodiments are provided to make the present disclosure more thorough and complete, and completely transfer the technical idea of the present disclosure to those skilled in the art.

In addition, unless explicitly described otherwise, 'including' any components will be understood to imply the inclusion of other components but not the exclusion of any other components. Furthermore, various elements and scopes in the drawings were schematically drawn. Accordingly, the technical idea of the present disclosure is not limited by the relative size and spacing depicted in the attached drawings.

The electrode of the present disclosure is characterized by using a plurality of conductive filaments in place of a heavy metal current collector.

The conductive filament refers to a conductive structure having a thin and long shape, and the length thereof may be several nanometers to several micrometers, but not limited thereto. For example, carbon fiber or carbon nanotube, nanowire, metal fiber and the like may be used as a conductive filament.

Here, the carbon fiber includes fiber composed of carbon, or may include CFRP (carbon fiber reinforced polymer) formed by carbon and other materials. Further, the carbon nanotube includes a material forming a tube shape by one carbon atom bonded to other carbon atom in a hexagonal honeycomb pattern. The kind of carbon nanotube is divided into single-walled, double-walled and multi-walled, depending on the number of carbon walls, and also divided into Torus, Nanobud, Cup stacked, Extreme and the like, depending on the arrangement of carbon layers. Further, the nanowire refers to a wire structure having a nanometer size. Further, the metal fiber refers to fiber formed of metal such as copper and aluminum.

Meanwhile, the electrode according to diverse exemplary embodiments of the present disclosure may be used in a positive electrode of an alkaline battery. Meanwhile, the battery using this electrode may be a lithium secondary battery. However, the present disclosure is not limited thereto, and the battery may be a battery using an alkaline metal such as Group 1 and Group 2 metals. For example, it may be a battery using Group 1 element such as H (hydrogen), Li (lithium), Na (sodium), K (potassium), Rb (rubidium), Cs (cesium) and Fr (Francium), and Group 2 element such as Be (beryllium), Mg (magnesium), Ca (calcium), Sr (strontium), Ba (barium) and Ra (radium), Ni (nickel), Pb (lead), and the like. Further, it may be classified into a lithium ion battery, a lithium ion polymer battery and a lithium polymer battery, depending on the kind of separator and electrolyte. In addition, it may be classified into a coin type, a button type, a sheet type, a cylinder type, a column type, an angular type, a pouch type and the like, depending on the shape, and classified into a bulk type and a thin film type, depending on the size. Hereinafter, it will be assumed that the electrode is used in the lithium battery, for convenience of description.

FIG. 1 is a flow chart for describing a method for manufacturing an electrode according to an exemplary embodiment of the present disclosure.

Referring to FIG. 1, first, active material slurry is applied on a metal thin film (S110). The active material slurry is a mixture of an active material in a binder solution. Additionally, a conductive material is further added to be mixed.

The active material refers to a material capable of reversible insertion/desorption of lithium ions. As an example, sulfur (S) or a sulfur compound may be used as an active material.

A sulfur compound is a compound having a sulfide bond, and may refer to an S—C compound having a bond of sulfur and carbon, or an S-M compound (M=Fe, Ni, Ti, Co, Mn) having a bond of sulfur and metal. As a specific example of the S—C compound, a sulfur-polyacrylonitrile composite (S-PAN) may be mentioned.

As another example of the active material, at least any one of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$ $LiNi_{1-y}MnyO_2$ (wherein $0=Y<1$), $Li(Ni_aCo_bMn)$ $O_4$ ($0<a<2$, $0<b<2$, $0<c<2$, $a+b+c=2$), $LiMn_{2-z}Ni_zO_4$, $LiMn_{2-z}Co_zO_4$ (wherein $O<Z<2$), $LiCoPO_4$, and $LiFePO_4$ may be used as the active material.

A binder is a component assisting the active material, the conductive material and the like to be bound. As an example of the binder, polyacrylonitrile (PAN), polyvinylidene fluoride (PVDF), polyvinylalcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like may be listed. This binder may be mixed in an adequate volume relative to a total weight of the active material layer to a degree having no problem in adhesion and a capacity.

For a solvent for dissolving the binder, an organic solvent such as carbonates, esters, lactones, or DMAc (dimethylacetate), NMP (N-methylpyrrolidone) or the like may be used, depending on the characteristics of the binder.

A conductive material imparts conductivity to an electrode, and when using sulfur as an active material, it is common to use a carbon material as the conductive material. As an example of the conductive material, graphite such as natural graphite or artificial graphite, carbon black such as carbon black, acetylene black, Ketjen black, channel black, furnace black, lamp black or summer black, or conductive fiber such as carbon fiber or metal fiber, fluorocarbon, metal powder such as aluminum or nickel powder, conductive whisky such as zinc oxide or potassium titanate, conductive metal oxides such as titanium oxide, polyphenylene derivatives, or the like may be listed.

As described above, when the active material slurry in which the active material, the binder, the conductive material and the like are mixed is prepared, the prepared active material slurry is applied on a metal thin film in a constant thickness. Specifically, as an application process, methods such as screen printing, spray coating, coating using a doctor blade, gravure coating, dip coating, silk screening, painting, slot die and aerosol deposition may be used, depending on the viscosity of the composition forming the electrode layer.

Meanwhile, as a metal thin film on which the active material is applied, aluminum foil and the like may be used.

Next, a plurality of conductive filaments are embedded in the active material slurry applied on the metal thin film (S120). In this case, a flocking process may be used.

The flocking process generally refers to a process of fixing thread formed by cutting fiber short on a surface of the object. As a flocking manner, an electrostatic flocking is most frequently used. However, it is not limited thereto, and a flocking process in a spray manner and the like may be used in the present disclosure. In the present disclosure, the conductive filaments are fixed to the active material slurry using the flocking process. The conductive filament refers to a conductive structure having a thin and long shape, and the length thereof may be several nanometers to several micrometers, but not limited thereto. For example, carbon fiber or carbon nanotube, nanowire, metal fiber and the like may be used as a conductive filament.

Figure 2:
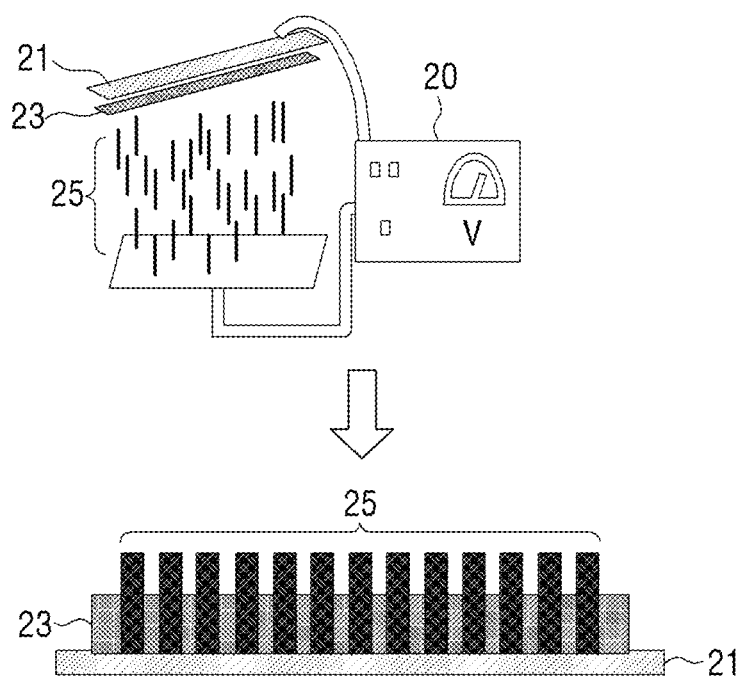
FIG. 2 is a drawing for describing a method for manufacturing an electrode using a flocking process according to an exemplary embodiment of the present disclosure.

FIG. 2 is a drawing for describing a method of embedding the conductive filaments in the active material slurry using the electrostatic flocking. Referring to FIG. 2, the active material slurry 23 is applied on the metal thin film 21, which is mounted on flocking equipment 20, and then an electronic field is generated to embed a plurality of conductive filaments 25 in the active material slurry 23.

Figure 3:
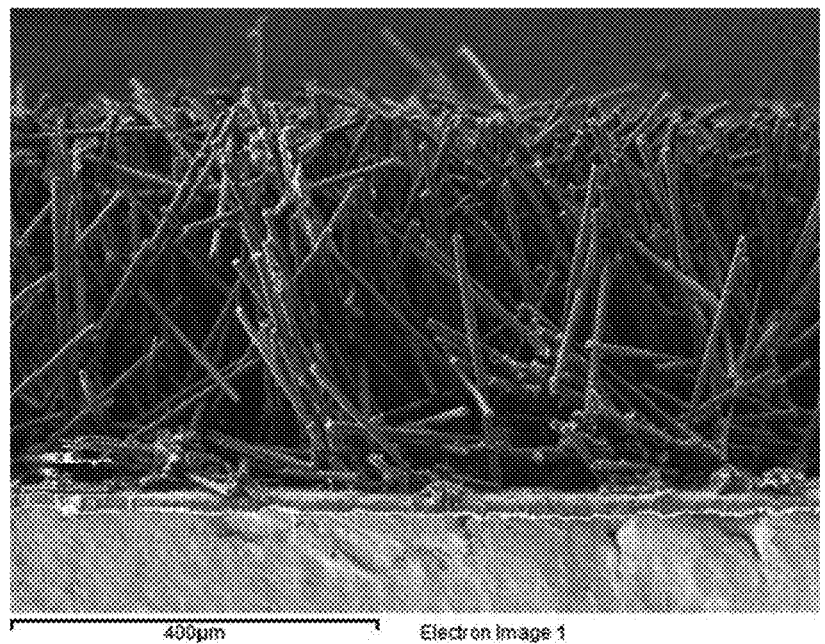
FIG. 3 is a SEM image of an electrode according to an exemplary embodiment of the present disclosure.

FIG. 3 is a SEM image in which the conductive filaments are embedded in the active material slurry. Here, the carbon fiber is used as the conductive filaments.

As illustrated in FIG. 3, it has a shape in which at least one of the plurality of conductive filaments is embedded in the active material layer in a manner such that in a certain length from the surface of the active material layer.

The length of the conductive filament is selected sufficiently to be exposed in a certain length from the surface of the active material layer. Meanwhile, when the conductive filaments are unduly long, the stability of the current collector may be affected. Taking these points into consideration overall, the length of the conductive filaments may be selected. According to an exemplary embodiment, the length of the conductive filament may be selected to be 300 µm to 500 µm.

The plurality of conductive filaments may be arranged to be apart from each other at regular intervals, or as illustrated in FIG. 3, the plurality of conductive filaments may be entangled with each other.

As such, the plurality of conductive filaments embedded in the active material slurry may form the current collector of the electrode of the present disclosure. That is, in place of the conventional heavy metal current collector, conductive filaments such as light carbon fiber or carbon nanotubes serve as the current collector, and thus, the weight of the electrode may become much lighter.

After the flocking process, the active material slurry embedded with the plurality of conductive filaments is subjected to heat treatment at a predetermined temperature (S130).

The plurality of conductive filaments embedded in the active material layer may be fixed by the heat treatment.

The heat treatment process may include a drying process such as natural drying and hot air drying.

After drying, the heat treatment may be further carried out at a relatively high temperature. In this case, the characteristics of the electrode may be varied with time to perform heat treatment at high temperature.

Meanwhile, the binder having a low melting point may be vaporized by the heat treatment, and pores may be formed in the place where the binder is vaporized. The formed pores serve to minimize electrode deformation when charging/discharging.

In addition, the metal thin film on which the active material slurry was applied may be separated by the heat treatment process. As a result, an electrode in which the plurality of conductive filaments are embedded in the active material layer may be obtained.

Meanwhile, the thus-obtained electrode may be bended since it does not use a metal plate as the current collector. Therefore, a flexible battery may be manufactured using this.

Figure 4:
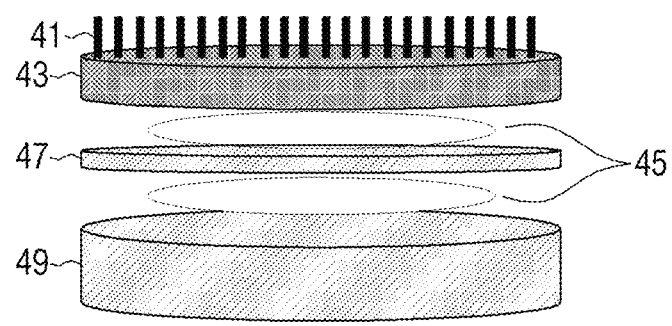
FIGS. 4 and 5 are drawings for describing batteries according to diverse exemplary embodiments of the present disclosure.

FIG. 4 is a drawing schematically illustrating the battery according to an exemplary embodiment of the present disclosure.

Referring to FIG. 4, the battery 400 includes a positive electrode current collector 41, a positive electrode active material layer 43, an electrolyte 45, a separator 47, and a negative electrode active material layer 49.

The positive electrode current collector 41 may be composed of a plurality of conductive filaments. Specifically, the plurality of conductive filaments is embedded in the positive electrode active material layer 43. As a method for embedding the conductive filaments in the positive active material layer 43, a flocking process may be used. In this case, the density of the conductive filaments embedded in the positive electrode active material layer 43 may be adjusted depending on a flocking process time and the like.

The positive electrode active material layer 43 is a layer including the active material, and may use sulfur (S) or a sulfur compound. A sulfur compound is a compound having a sulfide bond, and may refer to an S—C compound having a bond of sulfur and carbon, or an S-M compound (M=Fe, Ni, Ti, Co, Mn) having a bond of sulfur and metal. As a specific example of the S—C compound, a sulfur-polyacrylonitrile composite (S-PAN) may be mentioned.

Specifically, the positive electrode active material layer 43 is obtained by heat treatment of the slurry in which the active material (particles or powder) and the binder are mixed, and the positive electrode active material layer 43 may further include the conductive material. If required, only the active material and the conductive material except for the binder may form the positive electrode active material layer 43. Meanwhile, as the positive electrode active material layer 43 is thicker, the electrode having higher energy density may be obtained.

According to an exemplary embodiment of the present disclosure, a positive electrode active material layer 43 may include pores for buffering the electrode deformation during charge/discharge. The pores in the positive electrode active material layer 43 may be adjusted according to the size, content and treatment method of a pore former. Here, the pore former may be $(NH_4)_2CO_3$, $NH_4HCO_3$, $(NH_4)_2C_2O_4$ and a mixture thereof, capable of being volatilized to be removed by heat treatment to form pores in the positive electrode active material layer 43; a polymer material such as poly(alkylenecarbonate), poly(alkyleneoxide), poly(dialkylsiloxane) and acrylate-based polymer, capable of being dissolved in a non-aqueous organic solvent to be eluted; alkali metal-containing carbonates such as $Li_2CO_3$, $K_2CO_3$ and $Na(CO_3)_2$, capable of being dissolved in acid to be eluted, or the like.

The positive electrode current collector 41 and the positive electrode active material layer 43 as such may form the positive electrode of the battery.

As the electrolyte 45, a material in the form of a thin film or a bulk is used, and a solid inorganic electrolyte or an organic polymer electrolyte is often used in practically used devices, while a liquid electrolyte is often used for experiments.

The electrolyte 45 may include a lithium salt and a non-aqueous organic solvent. Here, the lithium salt is a material which is dissolved in an organic solvent, and acts as a lithium ion source in the battery to enable the operation of a basic lithium secondary battery, and serves to promote lithium ion migration between the positive and negative electrodes.

The lithium salts may be selected from the group consisting of $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_2$, $LiAlCl_4$, $LiN(CpF2p+1SO_2)$ $(CqF2q+1SO_2)$ (wherein p and q are a natural number), $LiSO_3CF_3$, $LiCl$, $LiI$, lithium bisoxalate borate, and a mixture thereof, but not limited thereto.

The non-aqueous organic solvent serves as a medium in which ions involved in the electrochemical reaction of the battery may migrate. As the non-aqueous organic solvent, a carbonate-based, an ester-based, an ether-based, a ketone-based, an alcohol-based, or an aprotic solvent may be used.

The non-aqueous organic solvent may be used alone or in combination with one or more, and a mixing ratio when used in combination with one or more may be properly adjusted depending on the battery performance to be desired, which may be understood by a person skilled in the art, and thus, detailed description thereof will be omitted.

A separator 47 separates the positive and negative electrodes, and provides a migration passage of ions. As this separator 47, particularly those having low resistance to ion migration of an electrolyte and excellent electrolyte solution humidifying ability are preferred. For example, polyethylene, polyester, polypropylene, polyvinylidene fluoride or two or more multiple layers thereof may be used, and a mixed multiple layers such as polyethylene/polypropylene two layer separator, polyethylene/polypropylene/polyethylene three layer separator and polypropylene/polyethylene/polypropylene three layer separator may be used, of course.

As the negative electrode active material layer 49, lithium metal, carbonized or graphitized carbon materials, or lithium titanium oxide ($Li_4Ti_5O_{12}$, LTO) which is commonly used in a lithium battery may be used.

Meanwhile, according to diverse exemplary embodiments of the present disclosure, the battery may be manufactured in various forms. The secondary battery illustrated in FIG. 4 may be understood to be a Swagelok type. In the Swagelok type, a case formed of a stainless steel material may serve as a current collector.

Meanwhile, according to another exemplary embodiment, it may be manufactured in a pouch form in which the case does not serve as a current collector. Therefore, in this case, a current collector composed of a plurality of conductive filaments serves as a positive electrode current collector alone in the positive electrode side.

Figure 5:
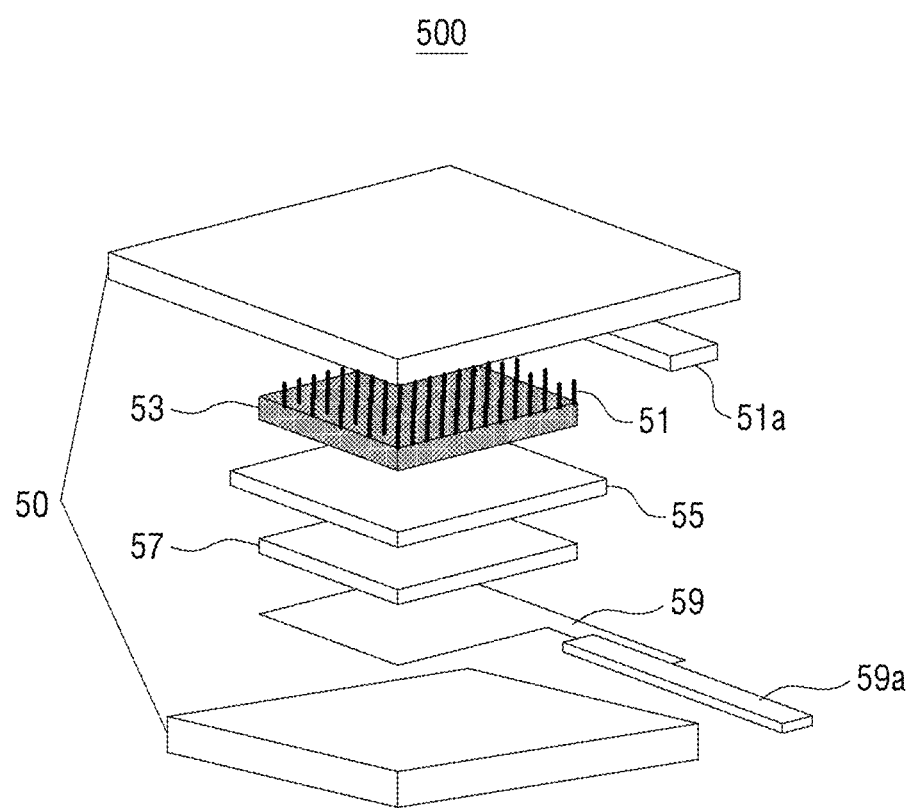

FIG. 5 is a drawing illustrating a battery in the form of a pouch according to an exemplary embodiment of the present disclosure.

Referring to FIG. 5, the battery 500 in the form of a pouch includes a packing material 50, a positive electrode current collector 51, a positive electrode active material layer 53, a separator 55, a negative electrode active material layer 57, a negative electrode current collector 59, a positive electrode tab 51*a* and a negative electrode tab 59*a*.

The packaging material 50 may be formed of a multilayer film including an inner resin layer serving as a sealing, a metal thin film layer serving as a barrier, and an outer resin layer serving to protect the battery from the outside. Here, the metal thin film layer is for preventing air, moisture and the like from being introduced into the battery and blocking effusion of gas produced in the battery to the outside, and may use an aluminum (Al) material.

The positive electrode current collector 51 may be composed of a plurality of conductive filaments. Specifically, the plurality of conductive filaments is embedded in the positive electrode active material layer 53. In this case, the positive electrode tab 51*a* is arranged to be in contact with the positive electrode current collector 51 composed of the plurality of conductive filaments.

The positive electrode active material layer 53 is a layer including an active material, and may use sulfur (S) or a sulfur compound as the active material. A sulfur compound is a compound having a sulfide bond, and may refer to an S—C compound having a bond of sulfur and carbon, or an S-M compound (M=Fe, Ni, Ti, Co, Mn) having a bond of sulfur and metal. As a specific example of the S—C compound, a sulfur-polyacrylonitrile composite (S-PAN) may be mentioned.

Specifically, the positive electrode active material layer 53 is obtained by drying the slurry in which the active material (particles or powder) and the binder are mixed, and the positive electrode active material layer may further include the conductive material. If required, only the active material and the conductive material except for the binder may form the positive electrode active material layer 53. As the positive electrode active material layer 53 is thicker, the electrode having higher energy density may be obtained.

A separator 55 separates the positive and negative electrodes, and provides a migration passage of ions. As this separator 55, particularly those having low resistance to ion migration of an electrolyte and excellent electrolyte solution humidifying ability are preferred. For example, polyethylene, polyester, polypropylene, polyvinylidene fluoride or two or more multiple layers thereof may be used, and a mixed multiple layers such as polyethylene/polypropylene two layer separator, polyethylene/polypropylene/polyethylene three layer separator and polypropylene/polyethylene/polypropylene three layer separator may be used, of course.

As the negative electrode active material layer 57, lithium metal, carbonized or graphitized carbon materials, or lithium titanium oxide ($Li_4Ti_5O_{12}$, LTO) which is commonly used in a lithium battery may be used.

As the negative electrode current collector 59, a metal thin film may be used, and as an example, copper foil may be used.

The positive electrode tab 51a and the negative electrode tab 59a are components for electrically connecting the current collectors in the positive and the negative electrode sides and an outer conductor, and may use aluminum, nickel material and the like.

In addition, though not illustrated in FIG. 5, the battery 500 further includes an electrolyte. The electrolyte used in a battery in the form of a pouch is mainly a gel type or a polymer.

Hereinafter, the method for manufacturing an electrode according to some exemplary embodiments, the electrode manufactured by the manufacturing method, and the battery manufactured using the electrode will be described for assisting the understanding of the present disclosure.

Manufacture of Electrode

First, sulfur (100 mesh or less, Aldrich Co.) and PAN (polyacrylonitrile) were prepared for preparing a sulfur-polyacrylonitrile composite (S-PAN). For all raw materials, pretreatment was carried out for removing moisture and impurities before use. Sulfur and PAN to be used as a binding material were dried at 60° C. for 24 hours. As the sulfur, sulfur having a size of 45 μm or less was used by passing raw material powder through a sieve of 325 mesh.

Sulfur and PAN were mixed at a weight ratio of 4:1, and mixed and crushed for 5 minutes using a mortar. Thereafter, heat treatment was carried out at 350° C., 400° C. and 450° C., respectively, for 3 hours under Ar atmosphere, and the obtained powder was named after heat treatment temperature as SPAN 350, SPAN 400 and SPAN 450.

The thus-obtained sulfur-acrylonitrile composite (S-PAN) and PAN as a binder, and acetylene black (AB, <1 μm, Alfa Co.) as a conductive agent were weighed at a weight ratio of 85:10:5, and a N-methyl-2-pyrrolidinone solvent (NMP, 99.5%, Aldrich Co.) and zirconia balls were added to a zirconia container, and then mixed at 350 rpm for 2 hours using a planetary ball milling machine. Mixed slurry was applied on aluminum foil with tape casting (six layers).

Further, using Flocking machine SPG 100 (maagflock, Germany), carbon fiber was attached to the lower electrode of the machine, and aluminum foil on which slurry was applied was attached to the upper electrode of the machine, and a voltage of 40 kV was applied to generate an electric field, with which carbon fiber was fixed to the slurry.

Thereafter, drying was carried out in an oven at 60° C. for 24 hours, and then heat treatment was carried out at 450° C. for 1, 3, 5 and 7 hours, respectively under argon atmosphere to manufacture each electrode. The thus-manufactured electrode was named pPAN-S/CF 1h, pPAN-S/CF 3h, pPAN-S/CF 5h and pPAN-S/CF 7h, respectively.

Manufacture of Battery

The electrode manufactured by the electrode manufacture example as described above was used as the positive electrode, and lithium metal (Aldrich Co.) was used as the negative electrode. The lithium metal was used as the negative electrode by punching a raw material to form a circle having a diameter of 1 cm in a glove box under argon atmosphere.

The electrolyte used in the battery was prepared in a glove box under gaseous Ar atmosphere by adding 1M LIPF$_6$ (Lithium hexafluorophosphate, Cheil Industries Inc.) electrolytic salt to 1:1 (vol. %) EC (ethylene carbonate, Cheil Industries Inc.) and DEC (diethyl carbonate, Cheil Industries Inc.) solvents.

As a separator, Celgard 2400 was used.

Stacking was performed in an order of lithium/liquid electrolyte/separator/liquid electrolyte/pPAN-S to manufacture two types of battery. One type was a Swagelok type battery of a stainless steel material, and the other type was a pouch type battery.

When the experiment was performed with the Swagelok type battery composed of a stainless steel material, though there was no metal current collector, the stainless steel serves as the metal current collector, and thus, it is difficult to exactly recognize whether carbon fiber serves as a current collector. Therefore, Experiment was performed to see whether carbon fiber serves as a current collector by manufacturing a pouch type battery without a metal current collector in the positive electrode side.

All of the processes of manufacturing batteries were carried out in a glove box under Ar atmosphere.

Evaluation of Structural Characteristics of Electrode

1) XRD (X-Ray Diffraction)

An X-ray diffraction test was performed to determine crystallinity and a crystal structure of the manufactured electrode. The test was performed using CuKα ray, in a 2θ range from 20° to 80° at a scan speed of 2°/min. The X-ray diffraction tester was D2 PHASER from Bruker.

2) FE-SEM (Field Emission Scanning Electron Microscopy)

XL30S FEG from Philips was used to observe the surface and sectional shape of the manufactured electrode and the electrode surface shape after charge/discharge.

3) EA (Elemental Analyzer)

EA (2400 series 2) was used to analyze the elements (C, H, N, S) of the prepared powder. Table 1 represents the elemental analysis result of the prepared sulfur-polyacrylonitrile powder.

TABLE 1

| No. | Sample name | Carbon(wt. %) | Hydrogen(wt. %) | Nitrogen(wt. %) | Sulfur(wt. %) In composite | Sulfur(wt. %) In electrode |
|---|---|---|---|---|---|---|
| 1 | SPAN 350 | 23.588674545 | 0.2337025705 | 8.4427822135 | 69.298534395 | 58.903754 |
| 2 | SPAN 400 | 35.10388565 | 0.3540085405 | 12.58977175 | 51.73939705 | 43.978487 |
| 3 | SPAN 450 | 39.084604265 | 0.5925151705 | 14.37441015 | 50.51754379 | 42.939912 |
| 4 | pPAN-S/CF 1 h | 41.063562395 | 0.761236131 | 15.05839777 | 40.62837982 | 38.5969608 |
| 5 | pPAN-S/CF 3 h | 41.410173415 | 0.8322159055 | 15.38502026 | 44.24015427 | 42.02814 |
| 6 | pPAN-S/CF 5 h | 42.03085518 | 0.7610538605 | 15.53256464 | 43.32798195 | 41.161582 |
| 7 | pPAN-S/CF 7 h | 44.85372353 | 0.9029652775 | 16.0152483 | 35.64500809 | 33.86275 |

4) TGA (Thermogravimetric Analyzer)

By confirming mass change at constantly raised temperature, the materials included in the sulfur-polyacrylonitrile composite were analyzed. The test condition was in a range from room temperature to 600° C. at a heating rate of 10° C./min.

5) Raman Spectroscopy

LabRAM HR800 UV was used for physical property analysis through molecular vibration of the sulfur-polyacrylonitrile composite using laser of short wavelength.

6) FT-IR (Fourier Transform Infrared) Spectroscopy

SMART-APEX II ULTRA was used for physical property analysis through molecular vibration of the sulfur-polyacrylonitrile composite using infrared ray.

7) Charge/Discharge Experiment

WBCS 3000 (WonA Tech CO.) was used to perform a constant current charge/discharge experiment for confirming the electrochemical behavior of the manufactured lithium/sulfur battery. Final voltage was determined at a current density of 0.2, 0.5 and 1.0 C-rates in a voltage range of 1-4 V.

Experiment Result

Figure 6:
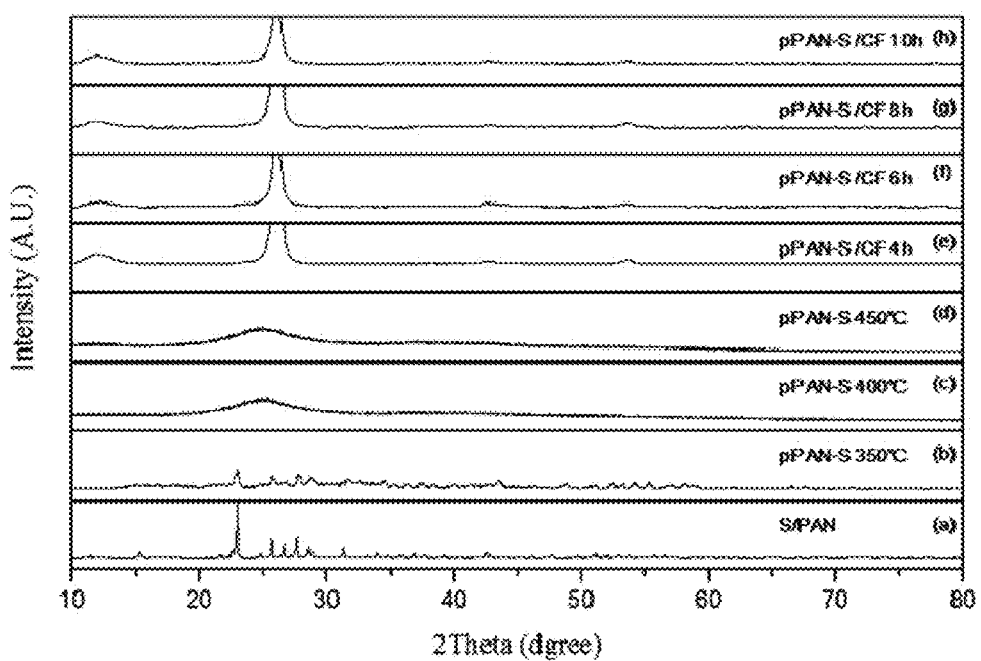
FIG. 6 is a XRD result of a sulfur-polyacrylonitrile composite and a pPAN-S/CF electrode.

FIG. 6 represents an XRD result for crystal structure analysis. It was confirmed that pPAN-S/CF electrodes have the peak of a graphite structure at 26° which matches the main peak of JCPDS 75-1621, and have a hexagonal crystal structure. The powder before S/PAN heat treatment showed the peaks of (222), (026), (117), and the like. In the case of SPAN 350, the peak of sulfur still appeared, but overall a gentle peak was shown, from which it may be confirmed that carbonation of PAN partially occurred.

In the case of SPAN 400 and SPAN 450, the peak of crystalline sulfur was not observed, from which it may be considered that a gentle peak near at 25° due to the carbonation of PAN was shown.

Figure 7:
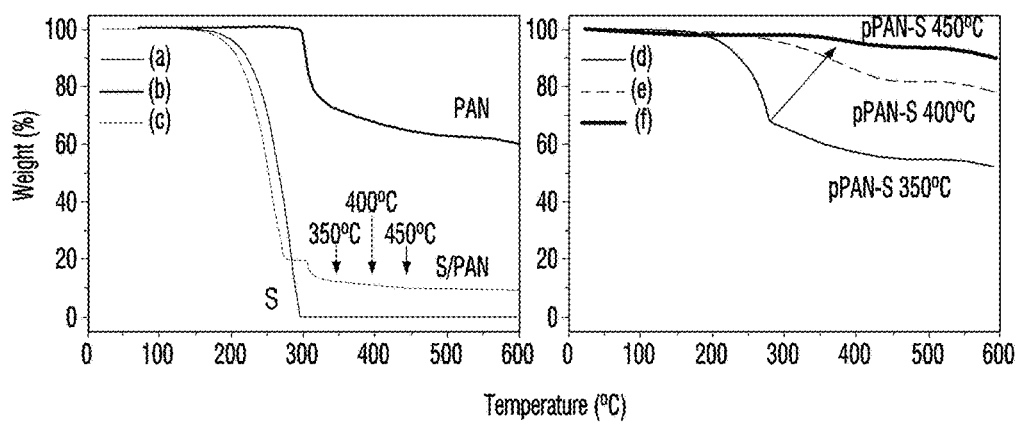
FIG. 7 is a result of thermogravimetric analysis of sulfur, polyacrylonitrile and a sulfur-polyacrylonitrile composite.

FIG. 7 is a result of thermogravimetric analysis (TGA profile) of sulfur, polyacrylonitrile and a sulfur-polyacrylonitrile composite. Sulfur was vaporized at 300° C., and the weight of polyacrylonitrile was reduced from 320° C. Further, the weight of a mixture of sulfur and polyacrylonitrile was reduced to 80 wt % up to 280° C. It may be considered that sulfur was vaporized from the fact that the mixture showed the same behavior as sulfur. Further, the weight reduction did not occur from 280° C. to 320° C., and the weight is gradually decreased from 320° C., and the weight reduction occurred to 90 wt % from 600° C.

From the TGA result, it may be recognized that sulfur and polyacrylonitrile are reacted from 320° C. Therefore, by changing the heat treatment temperature from 350° C. to 450° C., the sulfur-polyacrylonitrile composite was prepared. The weight of the heat-treated composite at 350° C. was reduced by 30 wt % up to 300° C., which is considered as being related to vaporization of sulfur. As the heat treatment temperature is raised, the weight reduction related to the vaporization of sulfur is decreased.

Figure 8:
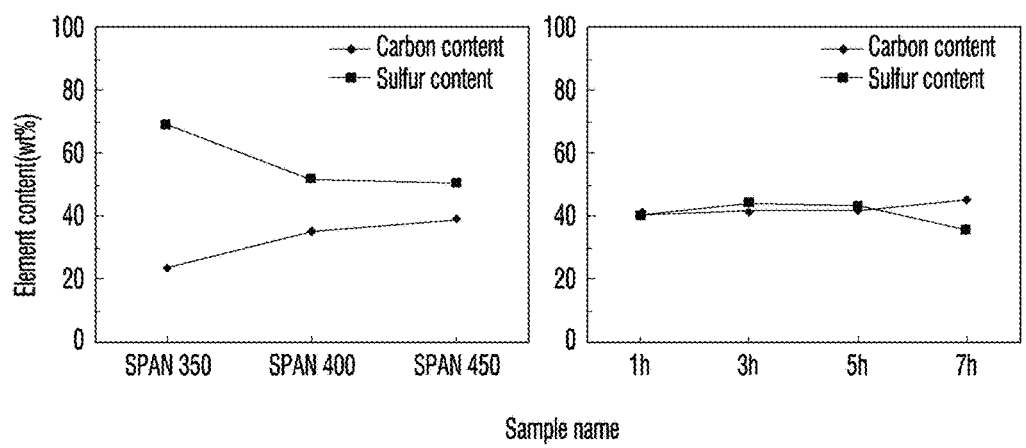
FIG. 8 is a result of elemental analysis of a sulfur-polyacrylonitrile composite and a pPAN-S/CF electrode.

FIG. 8 is a result of performing elemental analysis of a sulfur-polyacrylonitrile composite and a pPAN-S/CF electrode. As a result of changing the heat treatment temperature from 350° C. to 450° C., it was confirmed that as the temperature was raised, the content of sulfur was decreased, and the content of carbon was increased. It may be recognized therefrom that sulfur not reacting with polyacrylonitrile was vaporized during the heat treatment process. In the case of the pPAN-S/CF electrode, it may be confirmed that the weight reduction of sulfur with heat treatment time change was not great.

Figure 9:
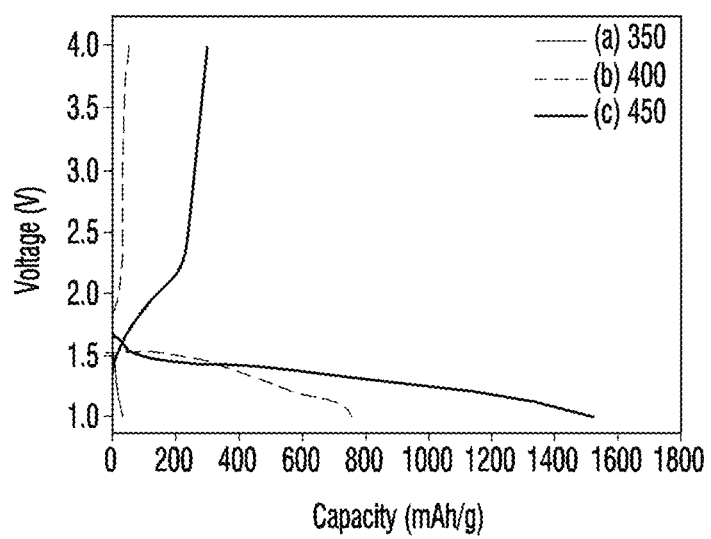
FIG. 9 is an initial charge/discharge graph of a sulfur-polyacrylonitrile composite depending on heat treatment temperature change.

FIG. 9 represents an initial charge/discharge graph of a sulfur-polyacrylonitrile composite depending on heat treatment temperature change. The sample of SPAN 450 had the highest discharge capacity of 1570 mAh/g-S. Therefore, a pPAN-S/CF electrode was manufactured using the powder of SPAN 450.

Figure 10:
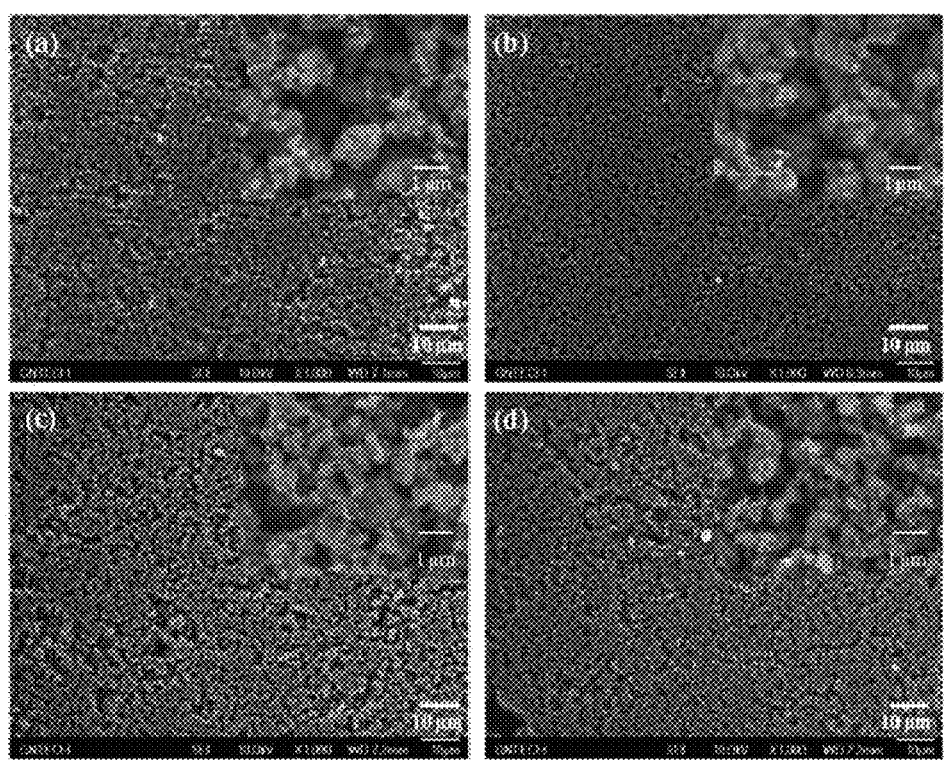
FIG. 10 is a surface SEM image of a pPAN-S/CF electrode depending on heat treatment time change.

FIG. 10 is a surface SEM image of a pPAN-S/CF electrode depending on heat treatment time change.

Referring to (a) pPAN-S/CF 1h, (b) pPAN-S/CF 3h, (c) pPAN-S/CF 5h, and (d) pPAN-S/CF 7h in FIG. 10, it may be confirmed that as the heat treatment time was increased, the pores of the electrode was decreased. It may be considered therefrom that as polyacrylonitrile was shrunk by dehydrogenation during the heat treatment process, the pores were decreased.

Figure 11:
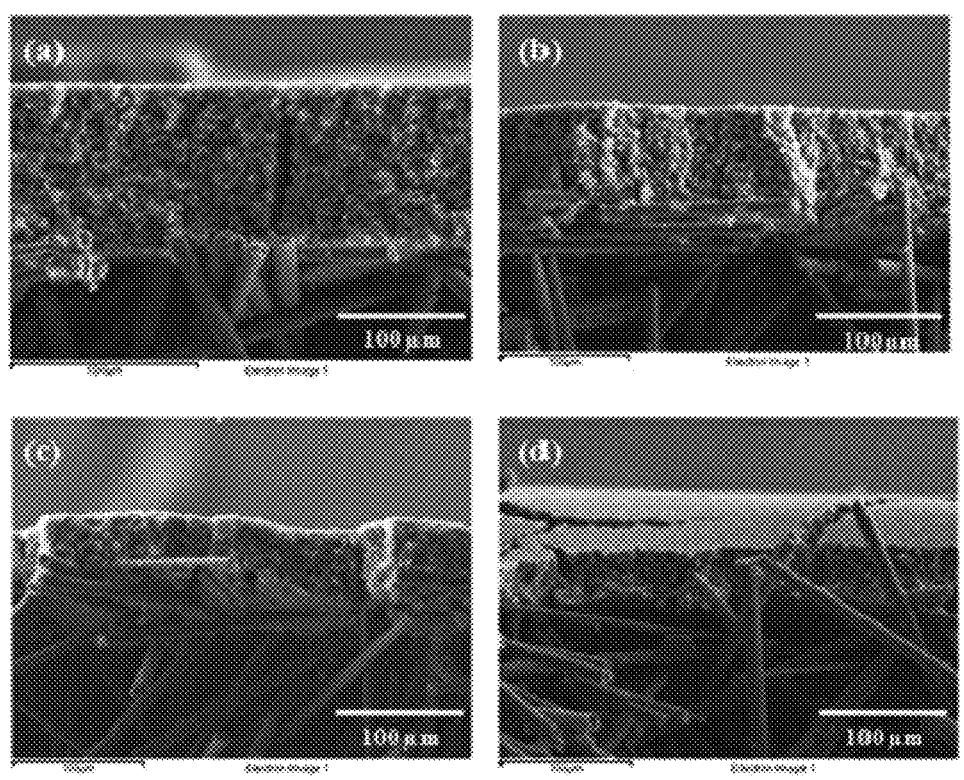
FIG. 11 is a SEM image of a sectional shape of a pPAN-S/CF electrode.

FIG. 11 is a SEM image of a sectional shape of a pPAN-S/CF electrode.

Referring to (a) pPAN-S/CF 1h, (b) pPAN-S/CF 3h, (c) pPAN-S/CF 5h, and (d) pPAN-S/CF 7h in FIG. 11, it may be confirmed that as the heat treatment time was increased, the thickness of the electrode was decreased. Considering this result, it is recognized that shrinkage in the inside as well as the reduced pores on the surface occurred.

Figure 12:
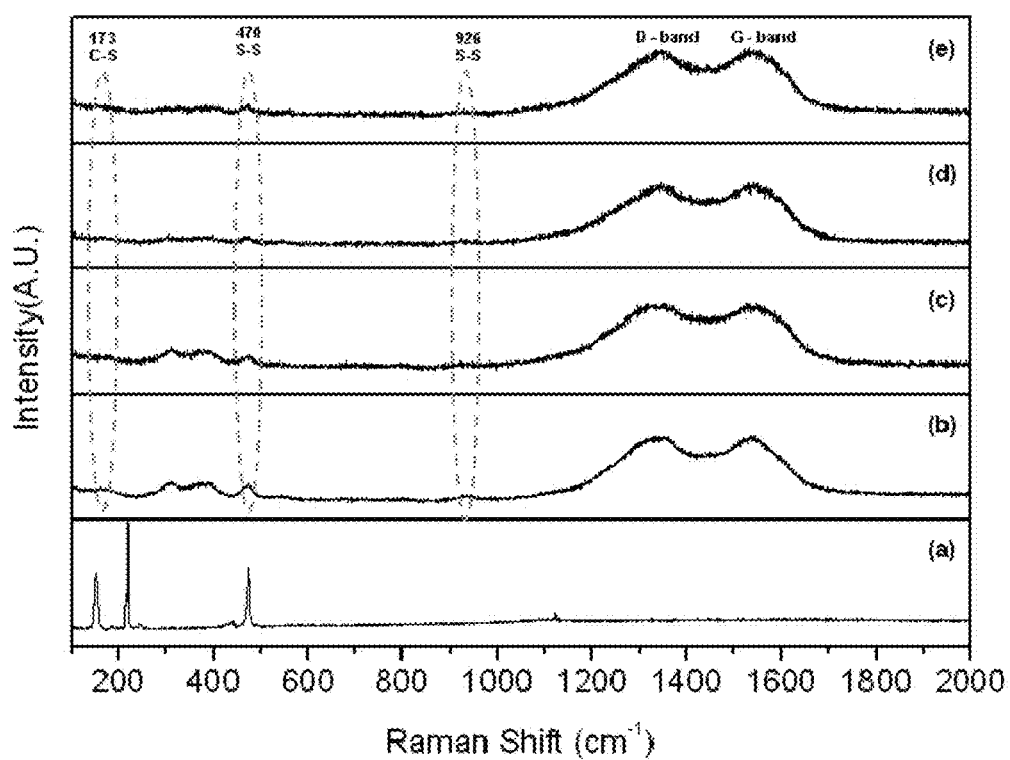
FIG. 12 is a result of measuring RAMAN of a pPAN-S/CF electrode and a sulfur-polyacrylonitrile mixture depending on heat treatment time.

FIG. 12 is a result of measuring RAMAN of a pPAN-S/CF electrode and a sulfur-polyacrylonitrile mixture depending on heat treatment time.

FIG. 12 represents RAMAN spectra for (a) S/PAN, (b) pPAN-S/CF 1h, (c) pPAN-S/CF 3h, (d) pPAN-S/CF5h and (e) pPAN-S/CF 7h, respectively. Referring to FIG. 12, in the case of a sulfur-polyacrylonitrile mixture, the S—S bond of sulfur may be confirmed. Further, the pPAN-S/CF electrode with the heat treatment temperature change may be confirmed to represent a D-band and a G-band by cyclization by the heat treatment of PAN. Further, any big difference depending on the heat treatment time was not confirmed.

Figure 13:
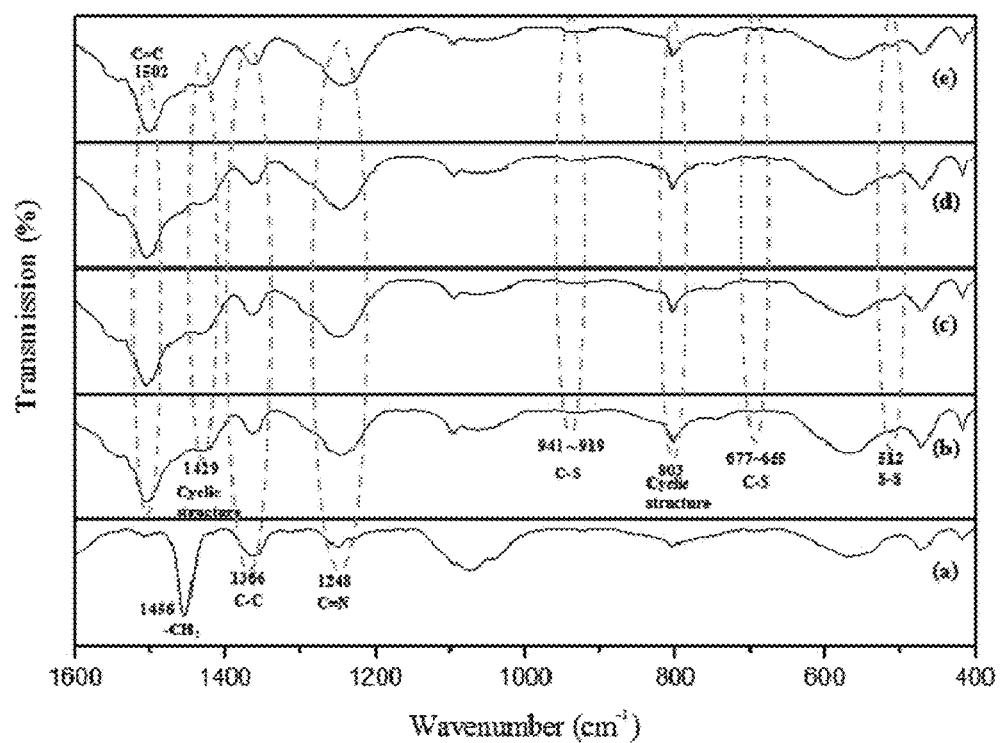
FIG. 13 is a result of measuring FT-IR of a pPAN-S/CF electrode and a polyacrylonitrile mixture depending on heat treatment time.

FIG. 13 is a result of measuring FT-IR of a pPAN-S/CF electrode and a polyacrylonitrile mixture depending on heat treatment time.

FIG. 13 represents FT-IR spectra for (a) PAN, (b) pPAN-S/CF 1h, (c) pPAN-S/CF 3h, (d) pPAN-S/CF5h and (e) pPAN-S/CF 7h, respectively. Referring to FIG. 13, —$CH_2$, C—C and C═N bonds may be confirmed in polyacrylonitrile. In the case of the pPAN-S/CF electrode, it may be considered that cyclization proceeded with the change of a $C_3N$ bond to C═N by heat treatment, from the fact that the bonding energy of C═N is increased. Polyacrylonitrile represented the similar result to the conventional research from which it is known that polyacrylonitrile shows electrical conductivity as cyclization proceeds.

Figure 14:
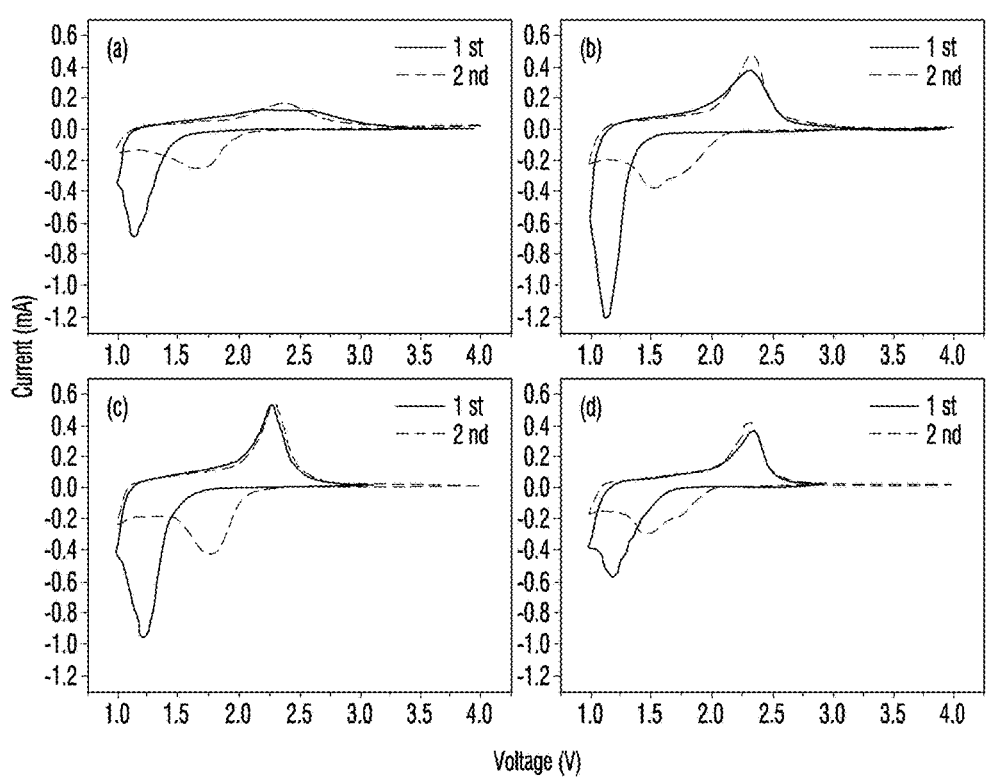
FIG. 14 is a CV result of a pPAN-S/CF electrode depending on heat treatment time change.

FIG. 14 is a CV result of a pPAN-S/CF electrode depending on heat treatment time change.

FIG. 14 is CV results of Li/pPAN-S/CF cells using (a) pPAN-S/CF 1h, (b) pPAN-S/CF 3h, (c) pPAN-S/CF 5h and (d) pPAN-S/CF 7h, respectively, at a 0.1 mV/s scan rate. Referring to FIG. 14, in the case of the pPAN-S/CF 3h electrode, at the first discharge, a reduction peak was observed near at 1.17 V, and at the second discharge, reduction peaks at 1.46 V and 1.74 V were shown, while in the pPAN-S/CF 5h electrode, at second discharge, a reduction peak was shown only at 1.75 V. Depending on the heat treatment time, the content of sulfur contained in the electrode is gradually decreased, and the amount of carbon is increased, and thus, it was expected that the electrical conductivity would be increased, however, in the case of the pPAN-S/CF 1h electrode, the first charge was not done well, and thus, it is considered that the area in CV representing a capacity is small. In the case of the pPAN-S/CF 7h electrode, the carbon content is the highest, and the electrical conductivity is good, but the sulfur content is the lowest, and thus, it is considered to have the lowest capacity. In the case of the pPAN-S/CF 5h electrode, the reaction zone between charge and discharge is the narrowest, that is, overvoltage is the lowest, and thus, it may be expected to show the best behavior.

Figure 15:
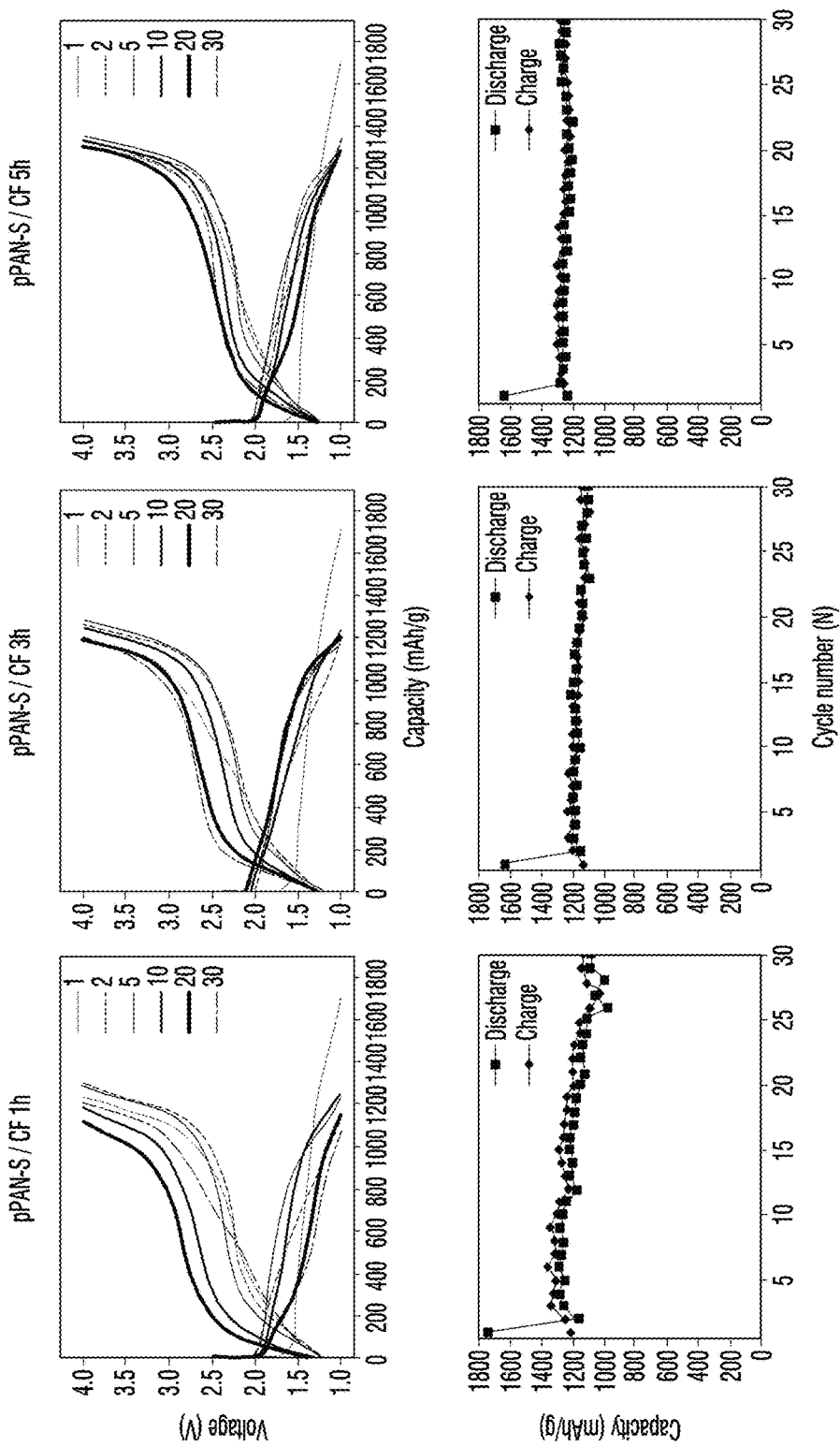
FIG. 15 is a result of examining charge/discharge behavior and cycle characteristics of a pPAN-S/CF electrode at 0.2 C-rate.

FIG. 15 is a result of examining charge/discharge behavior and cycle characteristics of a pPAN-S/CF electrode at 0.2 C-rate. In the case of the pPAN-S/CF 1h electrode, the second discharge capacity was 1162 mAh/g, and the discharge capacity after 30th discharge was 1086 mAh/g, and thus, the discharge capacity retention rate is 93.4%, which represents high reversibility. In the pPAN-S/CF 3h electrode, the discharge capacity retention rate between the second and the 30th discharge capacities was 96.4%, and in the pPAN-S/CF 5h electrode, the discharge capacity retention rate was 95.9%, representing an overall excellent discharge capacity retention rate. However, in the case of the pPAN-S/CF 1h electrode, considering the charge graph after $20^{th}$ cycles showing that overvoltage comparable to the charge behavior of other electrodes occurred, it may be concluded that the capacity of the battery was affected when proceeding with long term cycles.

Figure 16:
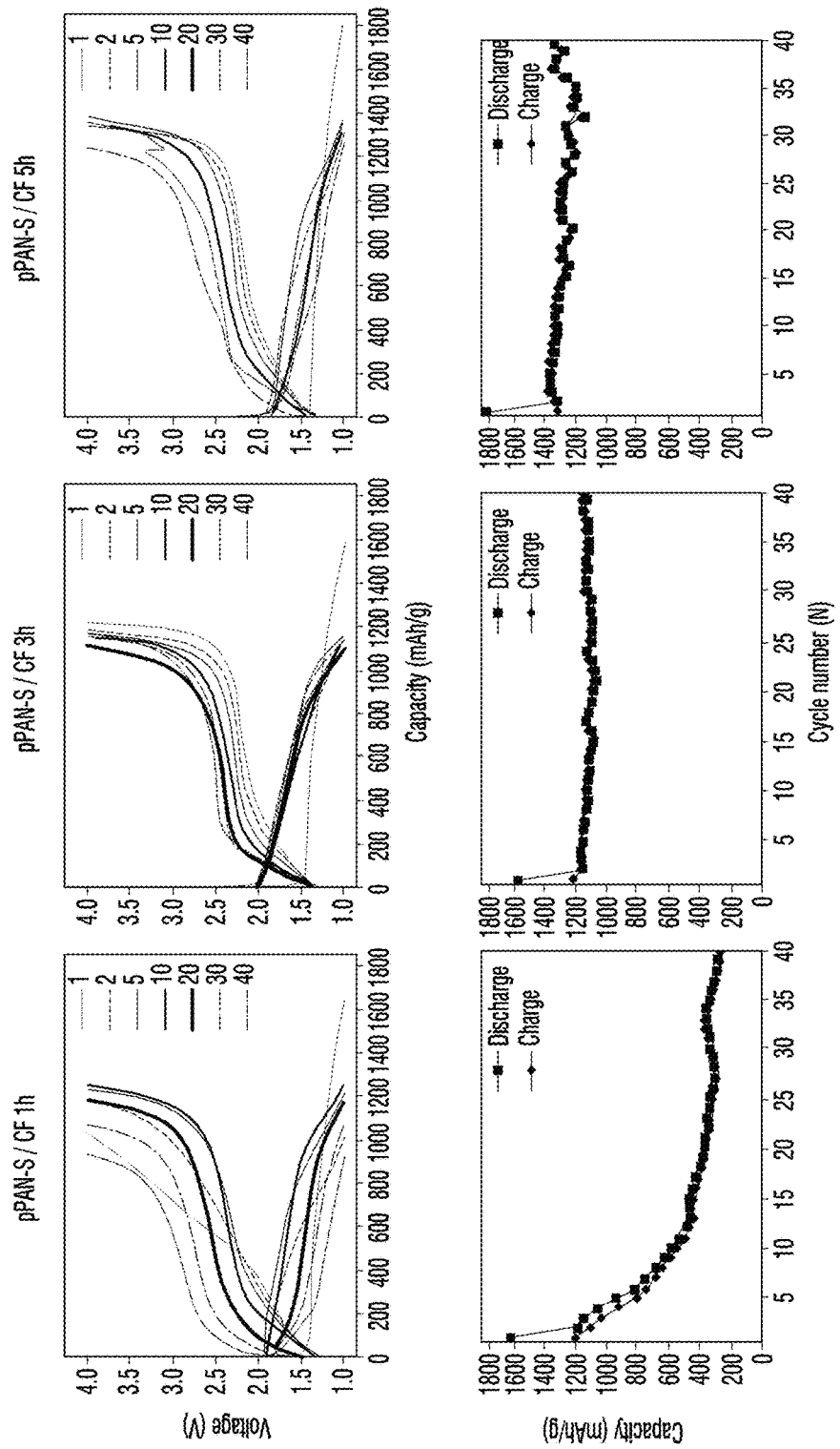
FIG. 16 is a result of examining charge/discharge behavior and cycle characteristics of a pPAN-S/CF electrode at 0.5 C-rate.

FIG. 16 is a result of examining charge/discharge behavior and cycle characteristics of a pPAN-S/CF electrode at 0.5 C-rate. In the case of the pPAN-S/CF 3h and the pPAN-S/CF 5h electrodes, the discharge capacity retention rate between the second discharge and the discharge after $40^{th}$ cycles was 97.8% and 100.8%, respectively, which show very good cycle characteristics, whereas in the pPAN-S/CF 1h electrode, it was confirmed that consistent capacity reduction was shown up to $15^{th}$ cycles, and cycle degradation slowed down after $15^{th}$ cycles, and thus, considering that overvoltage occurred as the cycle proceeded, electric resistance inside of the battery is increased to lead to large decrease in capacity. The capacity retention rate of the 1h electrode was 22.7%, which is compared with 93.4%, a high capacity retention rate at 0.2 C-rate.

Figure 17:
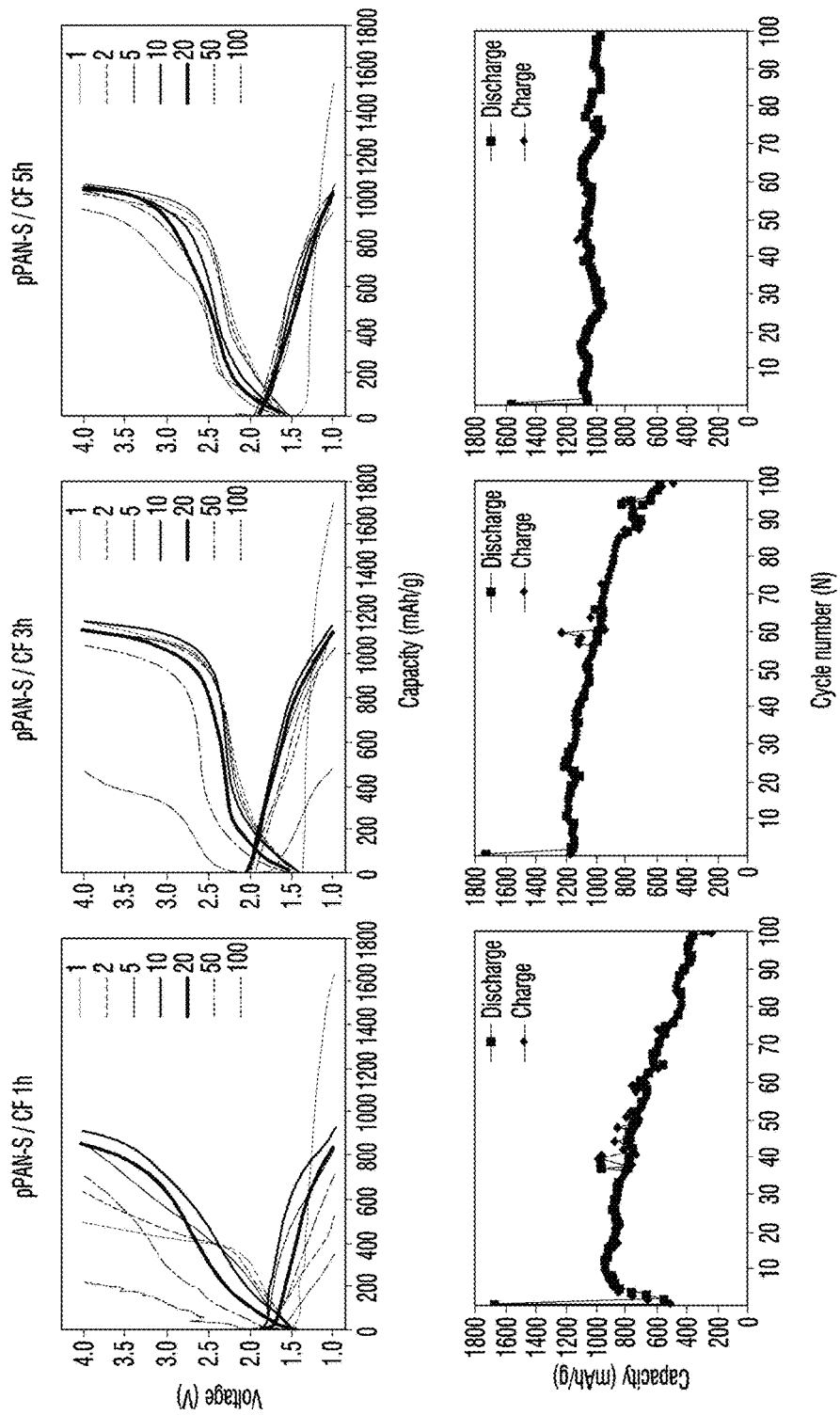
FIG. 17 is a result of examining charge/discharge behavior and cycle characteristics of a pPAN-S/CF electrode at 1.0 C-rate.

FIG. 17 is a result of examining charge/discharge behavior and cycle characteristics of a pPAN-S/CF electrode at 1.0 C-rate. As mentioned above for FIG. 15, the behavior in which the overvoltage of the pPAN-S/CF 1h electrode after $20^{th}$ cycles occurred from the initial cycle, and the capacity was rapidly decreased, and recovered at about $10^{th}$ cycle, and the cycle was degraded, was confirmed. In the case of the pPAN-S/CF 3h electrode, it was confirmed that the battery was unstable from $50^{th}$ cycle to about $60^{th}$ cycle. The reason was the result that discharge capacity retention rates of the pPAN-S/CF 1h and pPAN-S/CF 3h electrodes were 64.8% and 42.8%, respectively, which were even higher than the capacity retention rate of the pPAN-S/CF 1h electrode, however, the second discharge capacity was 535.5 mAh/g, which was lower than that of the pPAN-S/CF 3h electrode (1151 mAh/g). In the pPAN-S/CF 3h electrode having no high overvoltage with cycle proceeding at 1.0 C-rate, it is considered that the capacity was reduced due to the unstable charge graph at about $60^{th}$ cycle and high overvoltage at about $100^{th}$ cycle.

In the case of the pPAN-S/CF 5h electrode, the discharge capacity retention rate after proceeding with $100^{th}$ cycles was 91.5%, which was confirmed to be the highest retention rate, and the content of sulfur is decreased over heat treatment time, but carbonation of PAN progressed more to raise the electric conductivity of the electrode, and thus, overvoltage is not considered to occur even at relatively high controlled rate.

Figure 18:
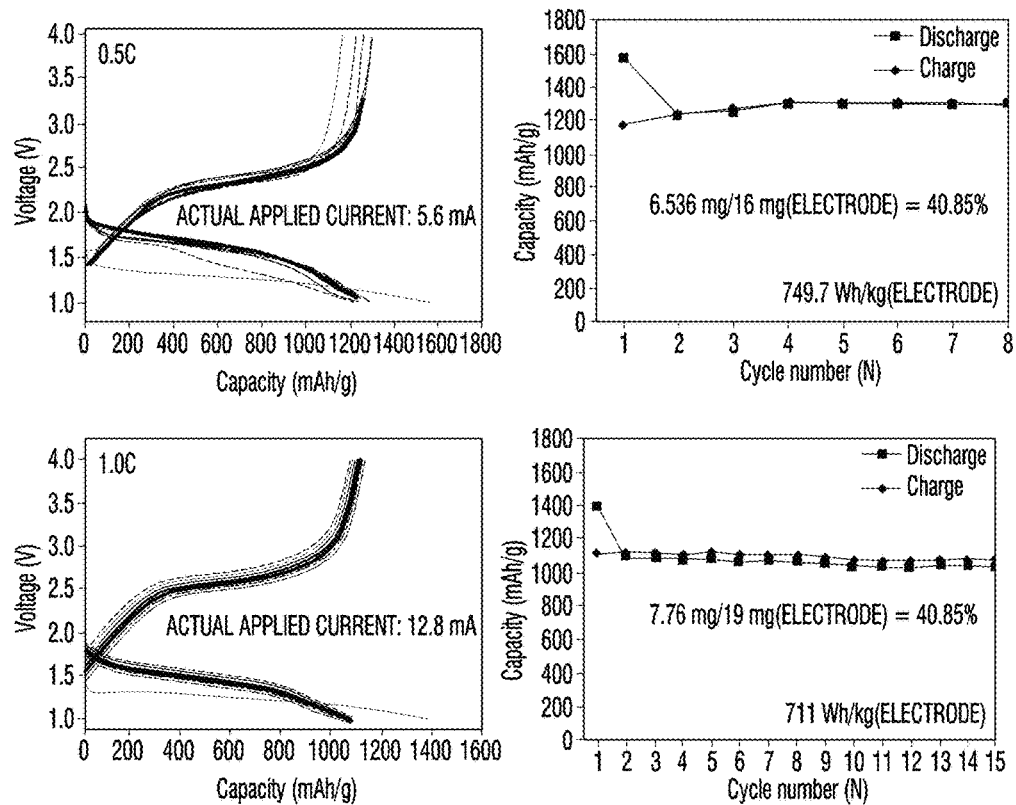
FIG. 18 is a result of proceeding with an electrochemical experiment of a pPAN-S/CF electrode using carbon fiber as a current collector by manufacturing a pouch type battery.

FIG. 18 is a result of proceeding with an electrochemical experiment of a pPAN-S/CF electrode using carbon fiber as a current collector by manufacturing a pouch type battery. The actual applied current at 0.5 C-rate was 5.6 mA, and as the cycles proceeded, the capacity was about 1200 mAh/g, and it was confirmed that the size of overvoltage was small. When calculating the energy density of the battery applied at 0.5 C-rate, a high energy density of 749.7 Wh/kg was confirmed. In the case that the pPAN-S/CF electrode using carbon fiber as the current collector is manufactured to be thicker, an electrode having high energy density would be manufactured.

Although the preferred embodiments of the present disclosure have been illustrated and disclosed, the present disclosure is not limited to the above-described certain exemplary embodiments, and of course, diverse modification may be carried out by those skilled in the art to which the present disclosure pertains without departing from the gist of the present disclosure as disclosed in the accompanying claims, and these modifications should not be understood from the technical idea or prospect of the present disclosure.

What is claimed is:

1. A method of manufacturing an electrode, comprising:
    applying an active material slurry on a metal thin film;
    embedding a plurality of conductive filaments in the active material slurry applied on the metal thin film; and
    subjecting the active material slurry embedded with the plurality of conductive filaments to heat treatment at a predetermined temperature to separate the active material slurry embedded with the plurality of conductive filaments from the metal thin film.

2. The method of claim 1, wherein the plurality of conductive filaments include metal fibers, carbon fibers, or carbon nanotubes.

3. The method of claim 1, wherein the active material slurry includes sulfur (S) or a sulfur compound, and the sulfur compound is an S—C compound or an S-M compound wherein M comprises one or more of Fe, Ni, Ti, Co, and Mn.

4. The method of claim 1, wherein the heat treatment is carried out at 300° C. to 500° C.

* * * * *